(12) United States Patent
Sharma et al.

(10) Patent No.: US 9,325,819 B2
(45) Date of Patent: Apr. 26, 2016

(54) DISTRIBUTED COMPUTING FOR PORTABLE COMPUTING DEVICES

(71) Applicant: Digimarc Corporation, Beaverton, OR (US)

(72) Inventors: Ravi K. Sharma, Portland, OR (US); Tony F. Rodriguez, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 14/248,057

(22) Filed: Apr. 8, 2014

(65) Prior Publication Data

US 2014/0342773 A1 Nov. 20, 2014

Related U.S. Application Data

(63) Continuation of application No. 11/198,004, filed on Aug. 5, 2005, now Pat. No. 8,694,049.

(60) Provisional application No. 60/599,479, filed on Aug. 6, 2004.

(51) Int. Cl.
*H04M 1/00* (2006.01)
*G06F 15/16* (2006.01)
(Continued)

(52) U.S. Cl.
CPC ........... *H04M 1/0264* (2013.01); *G06T 1/0064* (2013.01); *H04N 1/00204* (2013.01);
(Continued)

(58) Field of Classification Search
CPC ............... H04W 88/02; G06T 1/0064; G06T 2201/0052; H04N 1/3216; H04N 2201/3226; H04N 2201/3233

USPC .................. 455/558, 412, 556, 550.1, 556.1; 382/100; 709/217
See application file for complete search history.

(56) References Cited

U.S. PATENT DOCUMENTS 5,761,606 A 6/1998 Wolzien
6,064,737 A 5/2000 Rhoads
(Continued)

FOREIGN PATENT DOCUMENTS

GB 2390503 1/2004
JP 2000341657 12/2000
(Continued)

OTHER PUBLICATIONS

International Search Report dated Aug. 18, 2006 from PCT/US05/27735.
(Continued)

*Primary Examiner* — David Q Nguyen
(74) *Attorney, Agent, or Firm* — Digimarc Corporation

(57) ABSTRACT

This disclosure describes a distributed reader architecture for a mobile computing device such as cellular telephone handset. One claim recites a method for identifying a content item from a host signal captured on a mobile telephone handset, comprising: from the handset, receiving filtered data from the host signal for use in identifying the content item; processing the filtered data to compute a content fingerprints; using the content fingerprints to determine an action associated with the content item, in which said determining utilizes information pertaining to an operating system associated with the mobile telephone handset; and communicating information associated with the action to the mobile telephone handset. Of course, other claims and combinations are provided as well.

8 Claims, 3 Drawing Sheets

(51) Int. Cl.
*G06K 9/00* (2006.01)
*H04M 1/02* (2006.01)
*G06T 1/00* (2006.01)
*H04N 1/00* (2006.01)
*H04N 1/32* (2006.01)
*H04W 88/02* (2009.01)

(52) U.S. Cl.
CPC ....... *H04N1/00244* (2013.01); *H04N 1/00307* (2013.01); *H04N 1/00358* (2013.01); *H04N 1/00363* (2013.01); *H04N 1/00973* (2013.01); *H04N 1/3216* (2013.01); *H04N 1/32117* (2013.01); *H04N 1/32144* (2013.01); *G05B 2219/24162* (2013.01); *G06T 2201/0052* (2013.01); *H04N 2201/0096* (2013.01); *H04N 2201/327* (2013.01); *H04N 2201/3226* (2013.01); *H04N 2201/3233* (2013.01); *H04N 2201/3278* (2013.01); *H04W 88/02* (2013.01)

(56) References Cited

U.S. PATENT DOCUMENTS

| | | | |
|---|---|---|---|
| 6,121,530 | A | 9/2000 | Sonoda |
| 6,125,172 | A | 9/2000 | August |
| 6,389,055 | B1 | 5/2002 | August |
| 6,512,919 | B2 | 1/2003 | Ogasawara |
| 6,580,809 | B2 | 6/2003 | Stach et al. |
| 6,941,275 | B1 | 9/2005 | Swierczek |
| 6,968,337 | B2 | 11/2005 | Wold |
| 6,990,453 | B2 | 1/2006 | Wang |
| 7,251,475 | B2 | 7/2007 | Kawamoto |
| 7,321,756 | B2 * | 1/2008 | Yamashita ......... G06K 9/00013 379/433.1 |
| 7,844,271 | B2 | 11/2010 | Rouffet et al. |
| 2001/0051915 | A1 | 12/2001 | Ueno et al. |
| 2002/0028000 | A1 | 3/2002 | Conwell |
| 2002/0083060 | A1 * | 6/2002 | Wang et al. ............... 707/10 |
| 2002/0088336 | A1 | 7/2002 | Stahl |
| 2002/0102966 | A1 * | 8/2002 | Lev et al. ............... 455/412 |
| 2002/0120456 | A1 | 8/2002 | Berg |
| 2002/0152388 | A1 | 10/2002 | Linnartz et al. |
| 2002/0174431 | A1 | 11/2002 | Bowman |
| 2002/0178410 | A1 | 11/2002 | Haitsma et al. |
| 2003/0012403 | A1 | 1/2003 | Rhoads et al. |
| 2003/0021441 | A1 * | 1/2003 | Levy et al. ............... 382/100 |
| 2003/0033321 | A1 | 2/2003 | Schrempp |
| 2003/0072467 | A1 | 4/2003 | Brundage et al. |
| 2003/0083098 | A1 | 5/2003 | Yamazaki et al. |
| 2003/0123659 | A1 | 7/2003 | Forstrom et al. |
| 2003/0135623 | A1 | 7/2003 | Schrempp |
| 2004/0199387 | A1 | 10/2004 | Wang |
| 2004/0260682 | A1 | 12/2004 | Herley |
| 2005/0028189 | A1 | 2/2005 | Heine |
| 2005/0038635 | A1 | 2/2005 | Klefenz |
| 2005/0144455 | A1 | 6/2005 | Haitsma |
| 2005/0227674 | A1 | 10/2005 | Kopra |
| 2005/0267817 | A1 | 12/2005 | Barton |
| 2005/0273328 | A1 | 12/2005 | Padhi |
| 2006/0004630 | A1 | 1/2006 | Criddle et al. |
| 2006/0240862 | A1 | 10/2006 | Neven |

FOREIGN PATENT DOCUMENTS

| | | |
|---|---|---|
| JP | 2004179783 | 6/2004 |
| WO | WO 0207362 | 1/2002 |
| WO | WO0207362 A1 * | 1/2002 |

OTHER PUBLICATIONS

Notice of Reasons for Rejection dated Feb. 28, 2011 from JP2007-524987.
European Search Report dated Mar. 18, 2011 from EP10181431.7.
European Extended Search Report dated Jul. 5, 2012, from EP05783829.4.
European Examination Report dated Nov. 17, 2011 and Response dated May 25, 2012, from EP10181431.7.
Notice of Reasons for Rejection dated Jan. 17, 2012, from JP2007-524987.
Final Rejection dated Feb. 27, 2012, from Chinese Patent Application No. 200580032902.2.

* cited by examiner

DISTRIBUTED COMPUTING FOR PORTABLE COMPUTING DEVICES

RELATED APPLICATION DATA

This application is a continuation of U.S. application Ser. No. 11/198,004, filed Aug. 5, 2005 (now U.S. Pat. No. 8,694, 049), which claims the benefit of U.S. Provisional Application No. 60/599,479, filed Aug. 6, 2004, which is hereby incorporated by reference.

TECHNICAL FIELD

The invention relates to signal processing and distributing computing, particularly in portable computing devices such as mobile phones.

BACKGROUND AND SUMMARY

Portable computing devices, like mobile phones, are becoming increasingly more powerful and functional. For example, these devices include cameras, video capabilities, television tuners, audio recording and playback capabilities, etc. Further, since these devices are also communication devices, they also provide network computing services, like access to the Internet, synchronization of data with other devices, etc.

Despite the increasing functional capabilities and increases in computing power, there is still significant strain on the computing power of a small, hand held device. As such, there is a need for enhanced architectures and computing methods that support the vast variety of functions becoming available while making the best use of the computing resources on the device.

One major drain on the computing resources of a mobile phone, for example, is multimedia signal processing. Examples of applications include capturing and sending photos, playing music, playing video, etc. One particular application is associating various actions with multimedia content, such as linking a photo of a product in a catalog or magazine to a web site providing more information or purchase opportunities. Another example is linking a picture of musician or advertisement to an action of downloading a related ring tone to a phone or downloading related music in streaming mode or file format to a mobile phone handset. Implementations of this application are described in WO00/70585 and U.S. Pat. No. 6,505,160, which are hereby incorporated by reference.

These types of applications present major challenges for system developers:

1. how can these applications be implemented in software that runs on the phone hand set?
2. can these applications be implemented to run efficiently on a handset?
3. do these applications have unique hardware or software requirements that are not currently available on the handset alone?
4. can the application be widely deployed across handsets with different computing platforms, operating systems, and processors? (e.g., some handsets only execute programs written Java, yet the application may not run efficiently in Java).

In the network computing world, distributing computing schemes have been developed to take complicated software tasks, break them into modules and distribute execution of these modules across networked and/or parallel processors. Because of the unique architecture of the mobile phone handset, these schemes may not directly translate to the mobile phone computing architectures now available. As such, there is a need for new computing schemes and new distributing computing architectures for this environment.

The invention provides a reader for content identification and related content identification methods for mobile computing devices such as cellular telephone handset. One aspect of the invention is a reader including a reader library that reads device capabilities and business model parameters in the device, and in response, selects an appropriate configuration of reader modules for identifying a content item. The reader modules each perform a function used in identifying a content item. The modules are selected so that the resources available on the device and in remote devices are used optimally, depending on available computing resources on the device and network bandwidth.

Additional aspects of the invention are methods for identifying a content item captured from a mobile telephone handset, as well as methods for using combinations of signal filtering, watermark detection and fingerprinting to identify content using a combination of handset processing and server processing.

One example of a reader module is a fast watermark detection module that quickly detects the presence of a watermark, enabling resources to be focused on portions of content that are most likely going to lead to successful content identification. A watermark signal structure for fast watermark detection is comprised of a dense array of impulse functions in a form of a circle in a Fourier magnitude domain, and the impulse functions have pseudorandom phase. Alternative structures are possible.

Further features will become apparent with reference to the following detailed description and accompanying drawings.

DETAILED DESCRIPTION

Figure 1:
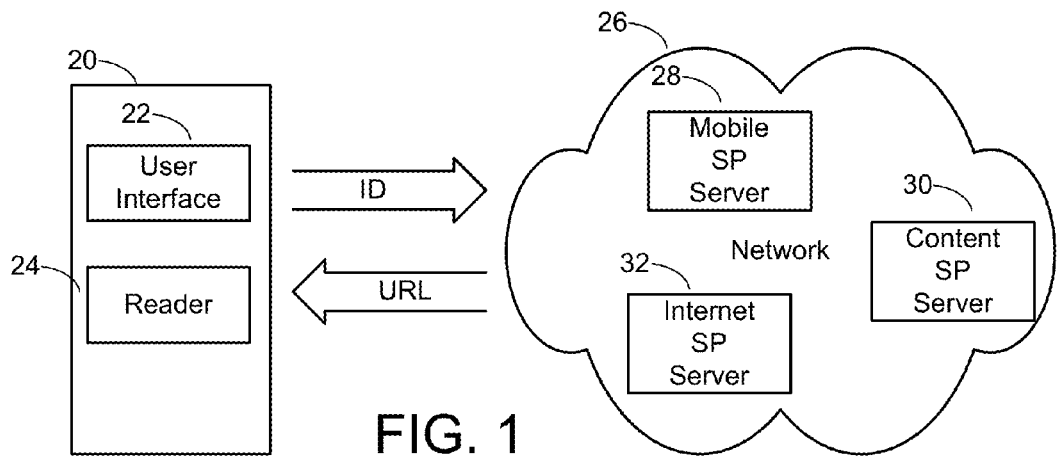
FIG. 1 is a diagram illustrating a mobile device handset and its communication with a network.

FIG. 1 is a diagram illustrating a mobile device handset 20 and its communication with a network. The handset includes a computing platform, including a processor, RAM, and persistent storage. On this platform, the handset processor executes programming instructions in functional modules on the device. While a typical handset may have many modules, this particular example shows a user interface 22 and a reader 24.

The user interface controls basic input/output functions, including receiving input from the handset's control keys, and providing output via a display and audio output device. The reader 24 processes multimedia input, such as frames of video, still images, and/or audio streams.

For the purpose of illustrating the operation of the computing platform of our mobile computing device architecture, we focus on the application of "connected content." Connected content refers to associating an action with content items. For example, the reader receives a content item, such as an image from email, the web, or captured from the device's camera, and the reader performs a series of actions to determine an action associated with that content item. This action may involve returning a web page for display, returning web links, playing music or video, downloading a ring tone, etc.

In the application of connected content, the reader illustrated in FIG. 1 performs a series of operations to compute an identifier (ID) of the content item. This identifier is then mapped to an action. This action is specifically represented in FIG. 1 as the return of a URL, which may represent a web page or some other network service delivered to the handset.

The handset communicates with a network 26 (e.g., an Internet Protocol network) via its built in mobile network connectivity system, which may be based on any of a variety of mobile communication technologies (e.g., 3G, GSM, CDMA, bluetooth, and combinations thereof). Within this network, there are various servers responsible for providing various services for handset users. These servers may include servers operated by the mobile telephone service provider, one or more Internet service providers, web servers on the Internet, content services, etc.

The challenge for this type of application is developing an efficient mechanism for mapping the content item to its corresponding action across different types of devices with varying software and hardware capabilities, and across different mobile telephone service providers with varying business models.

Figure 2:
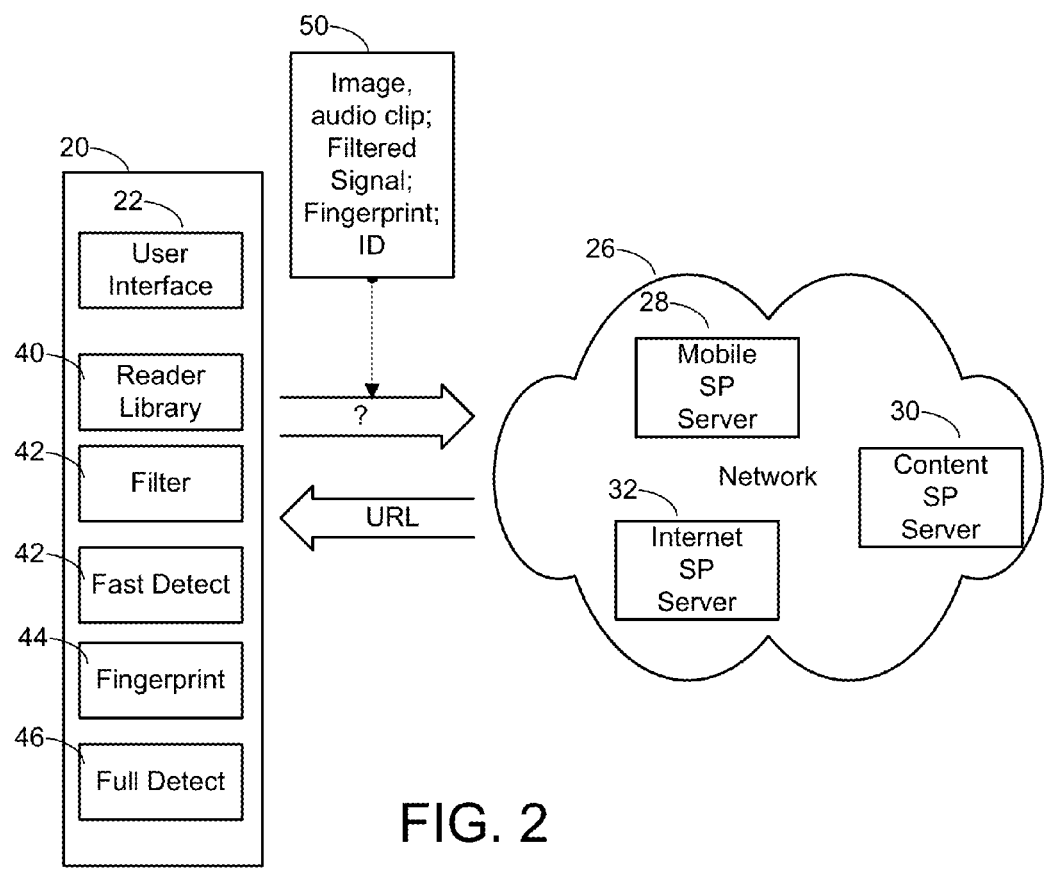
FIG. 2 is a diagram illustrating an expanded reader architecture that adapts based on device capabilities and business model parameters.

FIG. 2 is a diagram illustrating an expanded reader architecture that adapts based on device capabilities and business model parameters. The device capabilities may be fixed parameters, such as a particular type of processor, memory, signal processing modules (like optimized FFT module). They may also be variable, such as available computing cycles that vary with processing load and fluctuations in available bandwidth for transmitting content items to other processors (e.g., either network servers or neighboring devices connected via Bluetooth or other connections). The business model parameters also control computing by favoring certain types of operations over others to advance a desired business model. For example, it may be advantageous to use more bandwidth by sending content via the mobile service provider to a distributing computing resource rather than attempting to use only local computing resources on the handset. Other related parameters include location based services that vary based on location of the handset (e.g., determined by triangulation in the mobile phone network or via GPS hardware). The time of day and availability of processing resources on other connected devices may also control the reader operation.

To be adaptable, the reader is subdivided into modules that break down the reader application into functional blocks that can be executed separately, possibly in parallel and possibly taking advantage of distributed computing through mechanisms like Remote Procedure Calls to functions executing on other devices. The reader library 40 is a module that controls operation based on the device and business model parameters.

In this particular example, the reader library selects the combination of modules that are suited for the device and business model. The reader application process is divided into functions, such as filter 40, fast detect 42, fingerprint 44, and full detect 46. Each of these modules can play a role in the reader application process of receiving a content item and converting that content item into an action. Depending on the device and business model parameters, the reader library selects the modules on the handset that will participate. The rest of the functions, if any are left, are performed on one or more remote devices as explained below.

Depending on the selection of the reader library, part of the reader process is executed on the handset, and part is executed on a remote device (or multiple remote devices). As shown in box 50, the nature of the data sent from the reader to a remote device depends on which functions of the reader process are executed on the handset. In one scenario, the reader sends the content item (e.g., frames or blocks of an image or an audio clip) to a remote device for determination of its ID. This uses minimal resources on the handset, but consumes more bandwidth.

In another scenario, the filter 42 filters the content item leaving only components of the content necessary to complete the remaining content identification tasks. Examples of this type of filtering are described in U.S. Pat. Nos. 6,724,914 and 6,483,927, which are hereby incorporated by reference. Pre-filters used for digital watermark detection are described further below. Pre-filtering uses more processing resources on the handset and less bandwidth.

In another scenario, the handset performs a fast detect 42 to quickly identify whether a content item includes a digital watermark signal, and to provide registration information (so that the content can be aligned for further ID extraction through fingerprint analysis or digital watermark message extraction). There are several possible ways to implement fast detect. Some examples are described below. If the content identification is performed using some other machine readable code other than a digital watermark (e.g., a bar code or other visible machine symbology), the fast detect can be used to quickly identify the presence and location of the machine readable symbology.

In the case of the fast detect, the handset sends only blocks of content (e.g., filtered and/or geometrically registered, and/or with registration parameters) for which a fast detection has identified the presence of a code signal. This may consume more processing resources on the handset, but uses less bandwidth than sending all or substantial parts of the content to a remote device for identification.

The fast detect may also be used in conjunction with a fingerprint identification scheme where the fast detect provides registration parameters that facilitate accurate computation of the content fingerprint. The content fingerprint is a form of robust hash that is matched against a database of fingerprints to identify the content item.

In another scenario, the handset computes the content item's fingerprint using a fingerprint module. There are a variety of content fingerprint schemes available for video, audio and images. One type of fingerprinting process is to hash features of the content, such as frequency domain features, to compute a vector of hashes that are then matched with corresponding vectors of hashes in a fingerprint database. Once a match is found, the database returns a content identifier. In this scenario, the handset computes the fingerprint, and sends it to a database for content identification.

Finally, another scenario is to perform a full detect using a full detect module 46. This approach is premised on the existence of an identifier in machine readable form in the content item. This may constitute a digital watermark, bar code or other machine readable code. In this case, the handset uses the most processing resources and the least bandwidth because it does all the work necessary to identify the content item and only sends a small identifier to the network.

In the case where a URL represents the action to be performed, a device on the network looks up the identifier in a database and returns the corresponding URL to the handset. The action need not be represented by a URL. It can be some other process for returning programming or content to the handset or some device associated with the handset owner. For example, the database may return the name of an action, which in turn, triggers a server in the network to perform that action, either alone, or combination with other servers or devices. The action may include sending a video, music or image file, executing an electronic purchase transaction, downloading content or programming to the handset, etc.

Figure 3:
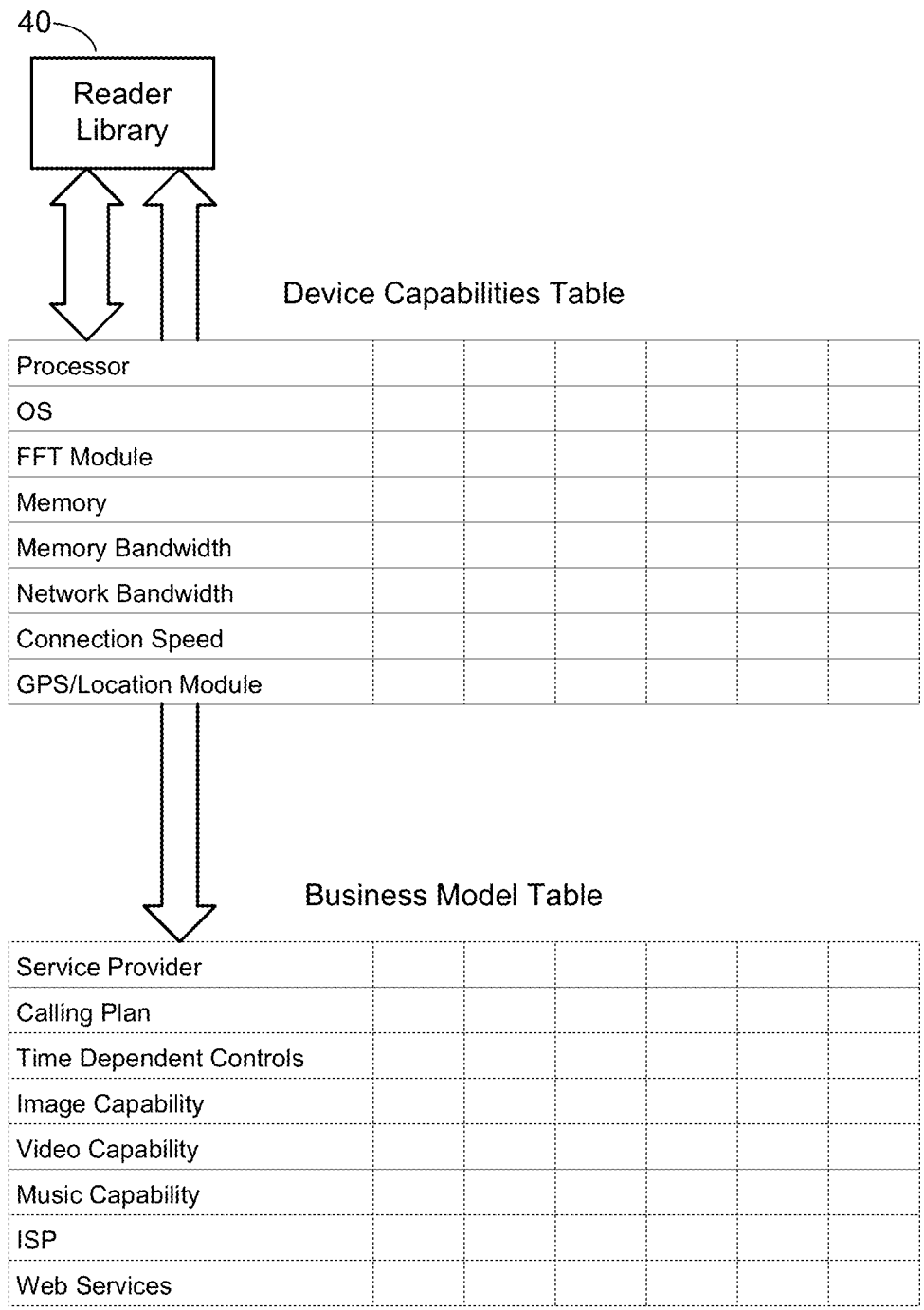
FIG. 3 is a diagram illustrating interaction between the reader library and tables that store parameters that the reader library uses to adapt its operation as a function of device capabilities, time, location, business model, etc.

FIG. 3 is a diagram illustrating interaction between the reader library and tables that store parameters that the reader library uses to adapt its operation as a function of device capabilities, time, location, business model, etc. In the illustration, the parameters used to control the reader library's selection of modules are represented in two tables: 1. A Device Capabilities Table, and 2. A Business Model Table. The first column in the device table lists device capabilities, like the processor type, the operating system, the existence of any special processing features that assist in signal processing like an FFT module, memory, memory bandwidth, network bandwidth, connection speed, and location service availability. This table acts as a registry of the available capabilities. Some of these capabilities are fixed, such as the processor; and others are variable depending on external conditions, such as the network bandwidth and connection speed. If a capability is present, then the items in the row corresponding to the capability are checked. The columns represent different possible configurations of the reader process, such as: "Extract ID on handset", "Extract ID on server" and "Distribute reader process between handset and server According to Bandwidth." In the latter example, the reader process adapts based on available bandwidth such that more processing is distributed to the server when more bandwidth is available.

The reader process may also adapt based on available computational cycles depending on other applications running on the handset at a particular time. If other higher priority applications are running, reader process functions are offloaded to the server.

The Business Model interacts with the reader library module in a similar way. The reader process can be configured differently based on, for example, the service provider, the calling plan for the phone, the time of day (use less bandwidth when bandwidth is more expensive to the user or provider), the ability of the service provider to manipulate images, video or audio on its or its partners' servers, etc. The reader process can also be adapted for different ISPs and web services that are available. For example some web services may support location based services, while others may not. Location based services enable the action performed in response to content identification to be tailored for the handset's location. Some providers may support ring tone downloading while others may not. There are many possible options, and the reader library can adapt depending on the settings in both the device and business model tables.

Distributed computing of the reader process is not limited to handset-server. Some handsets support bluetooth or other wireless connections to devices with additional processing power. Parts of the reader process can also be distributed to devices with range of a bluetooth connection, such as the user's home PC or other computing device.

Distributed processing can be implemented using Remote Procedure Calls. For example, the handset can make a call to a fingerprint module on a server and pass it a block of content. In response, the fingerprint module returns an ID, which is then mapped to an action.

Several processing threads can be spawned in parallel. For example, an image frame can be broken into blocks, each with its own reader process that is distributed between the handset and one or more remote devices networked with the handset. Once an ID is found or an action is correctly mapped to a content item, all concurrent reader processes are canceled. This is particularly useful when a stream of video frames captured by the handset camera are input to the reader library. In this case, the reader library distributes the reader process, frame by frame or block by block. The filter and fast detect blocks can be used to pre-process blocks of content before they are processed further for ID extraction. As explained below, the fast detect module can be used to weed out content that is unlikely to lead to a successful ID extraction.

The computing architecture described above can be used for other resource intensive processes to enhance the capability of mobile phone handsets. Below, we continue with the example of the reader application, and provide more information and digital watermarking and fingerprinting.

Digital Watermarking

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference.

Pre-Filtering for Signal Detection

In signal detection, and particularly digital watermark detection, a pre-filter may be used to de-correlate the signal being sought from the host signal. In particular for a digital watermark detector, a filter is used to de-correlate the digital watermark from the host signal.

One example of this type of de-correlating filter for digital image watermarks operates as follows. For each image sample, it compares the sample with each of its eight neighboring image samples. The filter replaces the value at the center sample with a value that is incremented each time the center sample value is greater than a neighbor value and decremented each time the center sample is less than the neighbor value. In particular, for each comparison, the filter increments by a value of 1 if the center sample is greater than its neighbor, it increments by a value of −1 if the center sample is less than its neighbor, and makes no change otherwise. The output of the filter will be between −8 and +8 when an eight neighborhood (3 by 3 sample region) is used in the filter implementation. Such type of a filter has a number of applications such as edge detection, signal enhancement, etc. in signal processing and operates on different media types (image, video and audio) and samples in various domains. For digital watermark applications, it may be used to estimate the original host signal and watermark signal, where the watermark signal is applied as an additive, antipodal PN signal.

The filter discussed in the previous paragraph may be implemented in variety of ways. One particular implementation makes comparisons between the center sample and each neighboring sample, and transforms the result of this comparison to an increment or decrement value (e.g., +k or −k, where k is a constant like 1, 2, 3, etc.). The filter sums each of the increment/decrement values from each neighbor, and then replaces the center sample value with the result of the summation. This type of filter can be implemented efficiently using a look up table. For example, the comparison operation is performed by subtracting the center sample value from a neighbor sample value to produce a difference value (−255 to +255 for an 8 bit sample). The result is then fed to a look-up table, which maps the difference value to an increment/decrement value and outputs that value. The filter sums the look-up table output for each neighbor in the neighborhood, and replaces the center sample with the result of the summation. This neighborhood may be the eight neighbors in 3 by 3 block of samples, the adjacent samples in a one-dimensional signal, the horizontally and/or vertically adjacent neighbors in a two or more dimensional signal, etc. The size of the neighborhood may be increased as well. The look-up table may be used to implement a variety of non-linear filters efficiently.

Fast Signal Detect

Very fast (computationally inexpensive) detection of the presence of a digital watermark signal is highly desired. Some existing digital watermark detectors employ 2D FFT, log-polar mapping and log-polar correlation for detecting the watermark signal and its registration parameters (e.g., rotation, scale, translation). The emphasis of fast detection is on alternative watermark signal designs and techniques that use substantially less processing than currently necessary for determining the presence of an embedded watermark signal.

A digital watermark may comprise several signal components, including a component used for fast detection and registration, a component for more accurate registration, and a component for conveying a variable message. These components can be integrated together or totally separate. For example, a signal component used for detection may also convey variable message bits. In this discussion, we focus on digital watermark structure design used for detection and registration. These watermark structures may also convey variable data, but this variable data carrying function is not the focus of this section. The patents incorporated above and the watermarking literature describe various schemes for conveying hidden data in digital watermarks.

Figure 4:
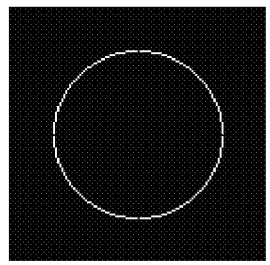
FIG. 4 is an example of a signal structure in the Fourier magnitude domain used for fast signal detection.

FIG. 4 illustrates a watermark signal structure in the Fourier Magnitude domain enabling fast detection and registration information. The watermark structure in FIG. 4 includes a dense full circle in the frequency domain. This circle is made up of individual impulse functions (e.g., sine waves) with pseudorandom phase with respect to each other. A full circle is an excellent candidate for fast detection. Detection of this structure exploits the fact that for a circle in the 2D Fourier domain, a slice through any axis (irrespective of rotation or scale) passing through DC is a pair of symmetrical points.

Projection of the 2D FFT onto 1 dimension (either X or Y axis) provides a fast mechanism to detect the presence of this signal. Presence of the signal is detected by pre-filtering an image block (as explained in the previous section) followed by 1D FFTs along each row, and summing the FFTs across rows to obtain the projection. Detection of a strong peak in the 1D projection indicates the presence of the watermark. Note that detection includes filtering, 1D FFTs, and peak finding in the 1D FFT, which can be computed in a more efficient manner than techniques requiring multiple 2D FFTs.

Figure 5:
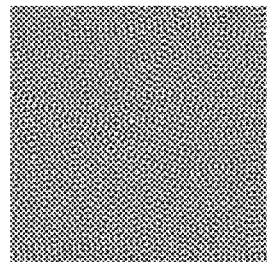
FIG. 5 illustrates the signal structure of FIG. 4 in the spatial domain.

FIG. 5 shows the spatial domain representation of the dense circle in FIG. 4. The phases are randomized so that the signal can be embedded into an image in a substantially imperceptible manner. Techniques for hiding this type of signal in a host image are described in U.S. Pat. No. 6,614,914, incorporated above. For example, a perceptual mask can be used to adjust the watermark signal as a function of the data hiding capability of a host image. In addition, the signal can be embedded in a color channel that is less perceptible to humans, such as the yellow channel.

Detection of Watermark Signal Presence

This section describes a number of alternative methods for quickly detecting the presence of the watermark signal structure shown in FIGS. 4-5. Methods 1-4 are different approximations to the actual 1D projection or 1D slice through the 2D transform and differ in computational complexity. Method 1 is the least expensive.

Method 1

Apply a 1D pre-filter on each row in the block (similar to 2D filter described in pre-filtering section above, but only performed on samples along a row)

Sum all rows in the block
Compute 1D FFT magnitude
Detect peaks

Method 2

Apply 2D pre-filter to block
Sum all rows in the block
Compute 1D FFT magnitude
Detect peaks Method 3

Apply a 1D pre-filter on each row in the block
Compute 1D FFT magnitude of each row
Sum row FFT magnitudes
Detect peaks Method 4

Apply 2D pre-filter to block
Compute 1D FFT magnitude of each row
Sum row FFT magnitudes
Detect peaks Method 5

Apply 2D pre-filter to block
Compute 1D FFT of each row
Sum row FFTs
Compute magnitude of sum
Detect peaks Advantages of Fast Detection Fast watermark detection provides the ability to quickly ascertain watermark presence in computationally challenging environments such as cell phones and low-end devices. This can result in faster and more reliable overall detection In server side detection, the fast detection process could be run on the client to identify signal-bearing image frames to be transmitted to the server. Using fast detection at the client side, the probability of not detecting at the server can be reduced. Only those frames in which fast detection is successful are transmitted to the server.

In client side detection, fast detection can be used to quickly discard frames that do not bear the watermark signal, rather than go through the entire registration and decoding processes. Frames in which the grid is detected are taken through subsequent watermark detection stages.

Fast detection is also useful in situations where it is necessary to quickly identify regions of interest for watermark detection. Additional processing resources can then be focused on particular regions of the signal where complete and accurate watermark reading is most likely.

Obtaining Registration Parameters

Although the full circle structure is primarily designed for fast watermark detection, it has interesting properties that can be exploited to provide registration parameters (i.e., synchronization).

1. The location of a peak relative to the x and y axes of the 2D FFT provides scale. Namely, the distance of the peak from the DC point in the x and y directions provides the scale in these directions.

2. When the distance of the peaks are computed for both the x and y axes as in 1, the location of the peaks also provides an indicator of differential scale.

3. Fitting an ellipse to the circle in the frequency domain (refer to the elliptical curve fitting technique in U.S. Pat. No. 6,483,927, incorporated herein) can help recover an affine transformation except rotation.

4. Rotation can be recovered either by exploiting the phases or by adding a few random impulse function points in addition to the dense circle.

Another approach to obtain registration parameters would be to use the full circle signal in the Fourier Magnitude domain in addition to a collection of other impulse functions. The full circle can provide fast detection and ability to recover from large differential scales, whereas the collection of other impulse functions can help recover any remaining parameters. See U.S. Pat. No. 6,614,914 for the use of a log polar transform to compute registration parameters from a collection of impulse function in the Fourier Magnitude domain.

Alternative Watermark Signal Design Choices

The dense circle is just one example of a signal that can be detected using the 1D projection. Other designs can be selected to reduce visibility of the signal in the spatial domain and make it easier to obtain other registration parameters. For example, 1. Concentric arcs
2. Non-symmetric arcs
3. Square centered at DC
4. Rhombus (or parallelogram) centered at DC
5. Signal designed such that there is an impulse function point at each possible rotation angle from 0 to 180 degrees. In this design, each point can be located at a unique radial distance from DC.
6. Multiple lines (not passing through DC) with different slopes in each quadrant.

Other Types of Fast Detection

The watermark signal (or other ID carrying signal) can be designed with distinct attributes that facilitate fast detection. These include unique colors, unique line structures, unique halftone screening structures used in printing (e.g., a unique screen angle or frequency), unique frequency content, a unique signature in the signal's histogram, etc. The fast detector is then tuned to measure evidence of these attributes, and if sufficiently present, direct further detection activities at the region where these attributes are found.

The Fast Detector as Positive Feedback

The fast detector enables the handset to display or emit a sound when the handset is close to capturing an image with a readable watermark (or other code signal). For many users, it may be difficult to position the handset's camera at the proper angle and distance from a watermarked object, leading to frustration. However, if the fast detector is constantly running on image frames captured while the handset is moving, the positive feedback from detection of the watermark signal can help guide the user to the correct location and orientation of the camera to ensure accurate watermark recovery. The user can then be instructed via a beep or light emitted by the handset to press a capture button to ensure that the image being captured is likely to contain a recoverable watermark signal.

Fingerprint Configurations

Below, we list several alternative approaches for using fingerprints, possibly in conjunction with fast detection of a watermark, to perform content identification on mobile computing device.

Approach 1

On capturing the image using the cell phone, calculate its fingerprint (i.e., some form of robust digital signature). Send the fingerprint to the server where it is matched with fingerprints in a database to identify the captured material. Further action can then be taken based on the ID returned by the database.

Approach 2

Similar to approach 1 except that instead of calculating the fingerprint, the image is sent to the server where it is matched (correlated) directly with a database of stored images.

Approach 3

Same as approach 1 except that a watermark template is embedded in the printed material to provide synchronization. Synchronization improves robustness of fingerprint extraction and matching because it allows the fingerprint to be computed after the content is aligned using the registration parameters from the synchronization process.

Approach 4

Same as approach 2 except that a template is embedded to provide synchronization. Synchronization simplifies/improves the task of matching with the database of images.

Approach 5

A payload message signal can additionally be used in approaches 3 and 4, making the system more robust. In other words, the system could rely on either the watermark or the fingerprint or both.

These scenarios are examples of alternative configurations that the reader library can select to adapt handset performance based on the device and business model parameters.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. A mobile telephone device comprising:
   memory;
   a sensor;

a processor;

a reader application stored in memory, said reader application causing said processor to select a processing component from a library of components, in which one component from the library of components comprises a reader module, said reader module for causing said processor to compute at least a subset of processing acts to produce content fingerprints from content sensed by said sensor, in which the content fingerprints comprise one or more hashes, and wherein the subset of processing acts to compute the content fingerprints comprises at least filtering, in which the filtering produces components of the content sensed from said sensor that are used to compute the content fingerprints, wherein the reader module includes a fast detect module, the fast detect module upon execution by said processor causes computation of registration parameters associated with the produced components, the fast detect module operating on said mobile telephone device; and a communications module stored in said memory, said communications module for causing said processor to control communication of the registration parameters and the produced components of the content sensed from said sensor to a remote computer resource, the remote computer resource computing the content fingerprints with reference to the registration parameters, said communication module also for controlling receipt of information from the remote computer resource that is responsive to the communication of the produced components.

2. The device of claim 1 wherein the filtering comprises a Fast Fourier Transform (FFT).

3. The device of claim 1 in which the library of components includes a digital watermark detector.

4. The device of claim 1 in which said memory comprises device capability information stored therein, in which said reader application is configured to utilize the device capability information.

5. A mobile telephone device comprising:

memory;

a sensor;

a processor;

means for selecting a processing component from a library of components, in which one component from the library of components comprises a means for reading, said means for reading computes at least a subset of processing acts to produce content fingerprints from content sensed by said sensor, in which the content fingerprints comprise one or more hashes, and wherein the subset of processing acts to compute the content fingerprints comprises at least filtering, in which the filtering produces components of the content sensed from said sensor that are used to compute the content fingerprints, wherein said means for reading comprises means for fast detection of registration parameters associated with the produced components, said means for fast detection operating on said mobile telephone device;

means for controlling communication of the registration parameters and the produced components of the content sensed from said sensor to a remote computer resource, the remote computer resource computing the content fingerprints with reference to the registration parameters; and means for controlling receipt of information from the remote computer resource that is responsive to the communication of the produced components.

6. The mobile telephone device of claim 5 wherein the filtering comprises a Fast Fourier Transform (FFT).

7. The mobile telephone device of claim 5 in which the library of components includes a digital watermark detector.

8. The mobile telephone device of claim 5 in which said memory comprises device capability information stored therein, in which said means for reading utilizes the device capability information.

\* \* \* \* \*